United States Patent
Song et al.

(10) Patent No.: US 9,532,348 B2
(45) Date of Patent: Dec. 27, 2016

(54) APPARATUS AND METHOD FOR OBTAINING INFORMATION RELATED TO REMOVING INTERFERENCE BASED ON STRUCTURAL IDENTIFIER ALLOCATION IN WIRELESS COMMUNICATION SYSTEM

(71) Applicant: Samsung Electronics Co., Ltd., Suwon-si, Gyeonggi-do (KR)

(72) Inventors: Seong-Wook Song, Seoul (KR); Tae-Yoon Kim, Seongnam-si (KR); Jong-Han Lim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 122 days.

(21) Appl. No.: 14/308,111

(22) Filed: Jun. 18, 2014

(65) Prior Publication Data

US 2015/0098395 A1   Apr. 9, 2015

(30) Foreign Application Priority Data

Oct. 4, 2013   (KR) .................. 10-2013-0118679

(51) Int. Cl.
*H04W 72/04* (2009.01)
*H04L 5/00* (2006.01)

(52) U.S. Cl.
CPC .......... *H04W 72/042* (2013.01); *H04L 5/0073* (2013.01); *H04L 5/0091* (2013.01)

(58) Field of Classification Search
CPC ..................... H04L 5/0073; H04W 72/042
See application file for complete search history.

(56) References Cited

U.S. PATENT DOCUMENTS

| | | | | |
|---|---|---|---|---|
| 6,317,421 B1 * | 11/2001 | Wilhelmsson | .......... | H04L 29/06 370/328 |
| 2008/0161008 A1 * | 7/2008 | Porat | .......... | H04W 8/26 455/450 |
| 2009/0303938 A1 * | 12/2009 | Kim | .......... | H04L 5/023 370/329 |
| 2010/0255852 A1 | 10/2010 | Chen et al. | | |
| 2011/0164572 A1 * | 7/2011 | Kim | .......... | H04B 7/024 370/328 |
| 2011/0212729 A1 * | 9/2011 | Li | .......... | H04W 48/16 455/450 |
| 2013/0040680 A1 | 2/2013 | Kim et al. | | |
| 2013/0064193 A1 | 3/2013 | Moon et al. | | |
| 2013/0077578 A1 | 3/2013 | Wang et al. | | |
| 2013/0121168 A1 | 5/2013 | Luo et al. | | |
| 2013/0128832 A1 * | 5/2013 | Kang | .......... | H04W 72/042 370/329 |

FOREIGN PATENT DOCUMENTS

KR  10-2012-0079820 A   7/2012
KR  10-2013-0058679 A   6/2013

* cited by examiner

*Primary Examiner* — Brian D Nguyen
(74) *Attorney, Agent, or Firm* — Jefferson IP Law, LLP

(57) ABSTRACT

A method for operating a terminal in a wireless communication system is provided. The method includes receiving control information masked with an identifier allocated according to a predefined rule for structural allocation, the control information being transmitted from a neighboring base station, and processing the control information by using the identifier.

24 Claims, 18 Drawing Sheets

FIG.6

APPARATUS AND METHOD FOR OBTAINING INFORMATION RELATED TO REMOVING INTERFERENCE BASED ON STRUCTURAL IDENTIFIER ALLOCATION IN WIRELESS COMMUNICATION SYSTEM

CROSS-REFERENCE TO RELATED APPLICATION(S)

This application claims the benefit under 35 U.S.C. §119 (a) of a Korean patent application filed on Oct. 4, 2013 in the Korean Intellectual Property Office and assigned Serial number 10-2013-0118679, the entire disclosure of which is hereby incorporated by reference.

TECHNICAL FIELD

The present disclosure relates to obtaining information related to removing interference in a wireless communication system.

BACKGROUND

In a wireless communication system, when a terminal connects to a base station, the base station allocates a unique identifier in order to identify the terminal. Thus, a unique identifier is used to identify each terminal in a common downlink control channel shared by all terminals and is included in control data. In the case of an LTE system, an identifier for the control channel is referred to as RNTI. An example where the identifier is used for a control channel is described below with reference to FIGS. 1 and 2.

FIG. 1 illustrates a process of generating control information in a wireless communication system according to the related art.

Referring to FIG. 1, a 16-bit CRC 120 is attached to a DCI 110 for error detection from a terminal that receives the control information. In addition, an identifier 130 for identifying each terminal is XOR-masked for the CRC 120. The control information including the DCI 110 and a tail bit 140 are encoded and modulated transmitted through a wireless channel. In the case of an LTE system, a channel over which the control information is transferred is referred to as PDCCH.

FIG. 2 illustrates a process of analyzing control information in a wireless communication system according to the related art.

When the terminal demodulates and decodes the control information, a decoded DCI 210 and a decoded tail bit 240 are obtained. In order to determine whether the DCI 210 received is control information for the terminal, that terminal generates CRC 220 from the decoded DCI 210, XOR operates on the CRC 220 and the tail bit 240, and further XOR operates on an identifier 230. When the received DCI 210 has no error and the identifier 230 matches an identifier used when generating control information by a base station, a value obtained by XOR operation is zero. Thus, the terminal may determine whether the DCI 210 received is control information for that terminal.

As described above, the control information may be decoded by using the identifier of a corresponding terminal. That is, if it is possible to perceive an identifier allocated to another terminal, a terminal may check control information for another terminal. Thus, as illustrated in FIG. 3, when a terminal located at a cell border experiences interference with a neighboring base station, the terminal may check control information for another terminal transmitted by the neighboring base station and utilize the control information for removing interference.

FIG. 3 illustrates a condition in which there is interference with a neighboring base station in a wireless communication system according to the related art.

Referring to FIG. 3, a terminal 310 receives a signal from a serving base station 320. However, since the terminal 310 is located at the cell border of the serving base station 320, a signal from the neighboring base station 330 is transmitted to the terminal 310. That is, the terminal 310 receives an interference signal from the neighboring base station 330. In this case, the terminal 310 may use identifiers allocated to terminals accessed to the neighboring base station 330 to decode control information transmitted from the neighboring base station 330 and utilize the identifiers for removing interference.

In order to check control information transmitted from the neighboring base station 330, the terminal 310 should obtain the identifiers of other terminals or perform blind detection. The identifiers of other terminals may be provided directly through the broadcasting channel of the neighboring base station 330 or indirectly through the serving base station 320. In this case, overhead increases depending on the number of terminals accessed to the neighboring base station 330. On the other hand, in the case of blind detection, since there is a need to perform decoding on all identifiers that may be used, the number of times that decoding is performed is large and moreover, a decoding failure probability is also high. In this case, the terminal 310 experiences a waste of power.

Thus, there is a need to suggest an alternative for efficiently providing or determining information on identifiers allocated to the terminals of a neighboring base station used for removing interference.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an apparatus and method for easily obtaining information needed for removing interference in a wireless communication system.

Another aspect of the present disclosure is to provide an apparatus and method for efficiently obtaining information on identifiers allocated to the terminals of a neighboring base station in a wireless communication system.

Another aspect of the present disclosure is to provide an apparatus and method for obtaining information needed for removing interference based on structurally allocated identifiers in a wireless communication system.

Another aspect of the present disclosure is to provide an apparatus and method for structurally performing identifier allocation for masking control information on a terminal in a wireless communication system.

Another aspect of the present disclosure is to provide an apparatus and method for decreasing the amount of data needed for providing identifier information allocated for control information masking in a wireless communication system.

Another aspect of the present disclosure is to provide an apparatus and method for decreasing the control information detection error probability of a neighboring base station in a wireless communication system.

In accordance with an aspect of the present disclosure, a method for operating a terminal in a wireless communication system is provided. The method includes receiving control information masked with an identifier allocated according to a predefined rule for structural allocation from a neighboring base station and processing the control information by using the identifier.

In accordance with another aspect of the present disclosure, a method for operating a base station in a wireless communication system is provided. The method includes allocating an identifier for masking control information to an accessed terminal according to a predefined rule for structural allocation and transmitting the control information masked with the identifier.

In accordance with another aspect of the present disclosure, an apparatus for a terminal in a wireless communication system is provided. The apparatus includes a reception unit configured to receive control information masked with an identifier allocated according to a predefined rule for structural allocation from a neighboring base station. The reception unit comprises a baseband processing unit configured to decode the control information by using the identifier.

In accordance with another aspect of the present disclosure, an apparatus for a base station in a wireless communication system is provided. The apparatus includes a control unit configured to allocate an identifier for masking control information to an accessed terminal according to a predefined rule for structural allocation and a communication unit configured to transmit the control information masked with the identifier.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 6 illustrates a particular example of blind detection in a wireless communication system according to an embodiment of the present disclosure;

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein may be made without departing from the range and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The present disclosure discloses to a technique of obtaining information for removing interference based on structural identifier allocation in wireless communication system. For the convenience of description, although the present disclosure uses terms defined in an LTE system, it may also be applied to another system that has a similar control channel structure.

According to the present disclosure, a terminal specifies candidates for identifiers allocated by a neighboring base station based on a rule defined for structural identifier allocation. According to an embodiment of the present disclosure, the terminal may receive information on the candidates from the neighboring base station or infer the candidates based on the rule, from specific identifiers detected through blind detection. In the following, each embodiment is described in detail.

Figure 1:
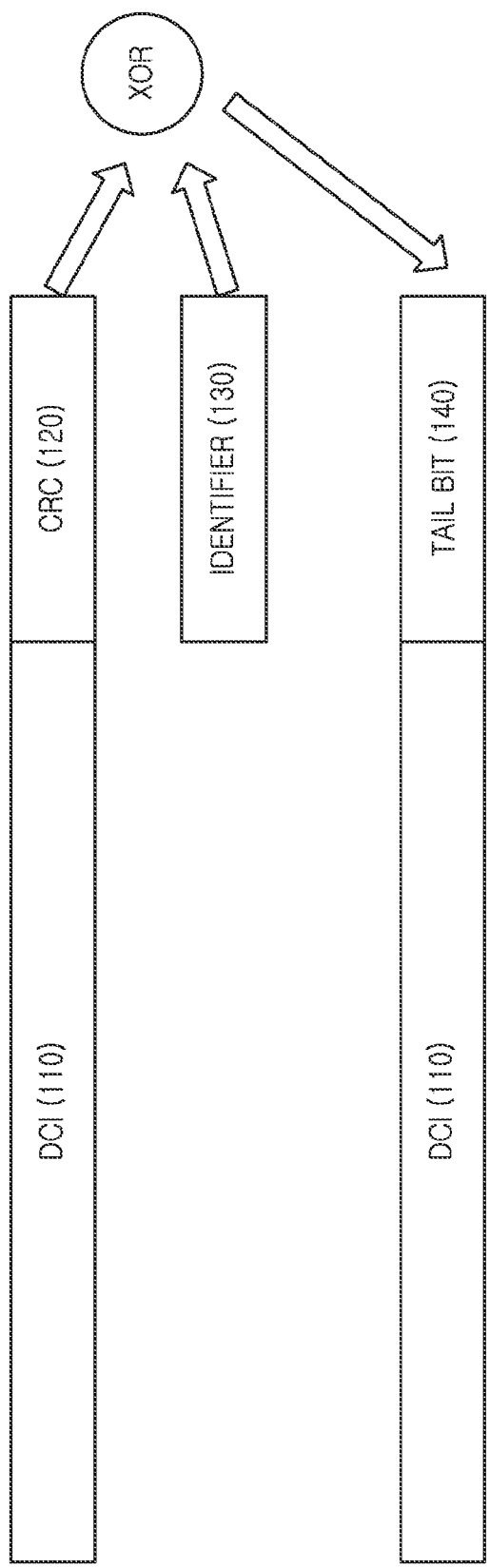
FIG. 1 illustrates a process of generating control information in a wireless communication system according to the related art.
Figure 2:
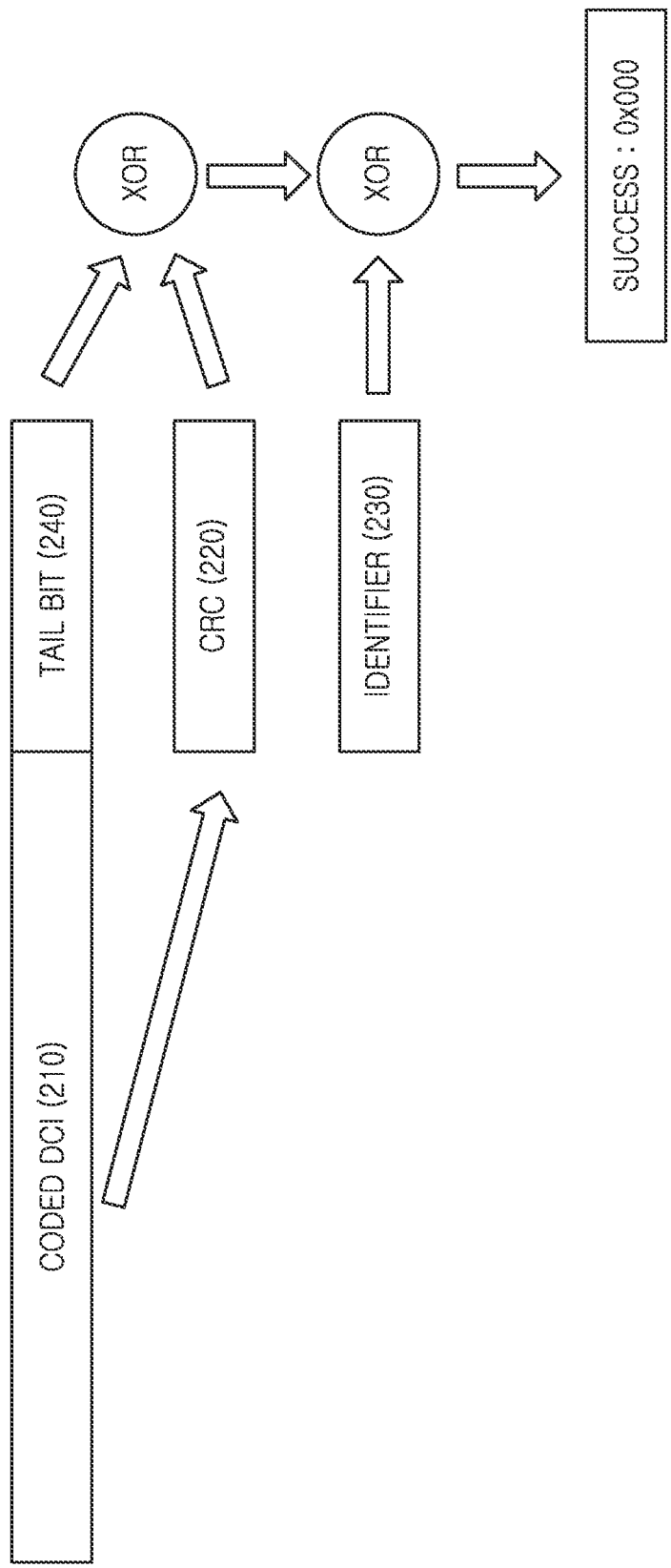
FIG. 2 illustrates a process of analyzing control information in a wireless communication system according to the related art.
Figure 3:
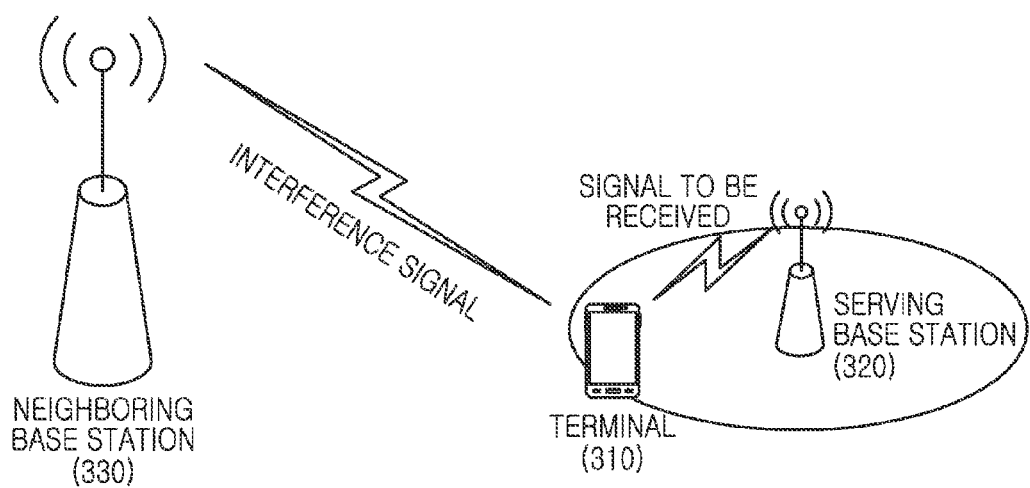
FIG. 3 illustrates a condition in which there is interference with a neighboring base station in a wireless communication system according to the related art.
Figure 4:
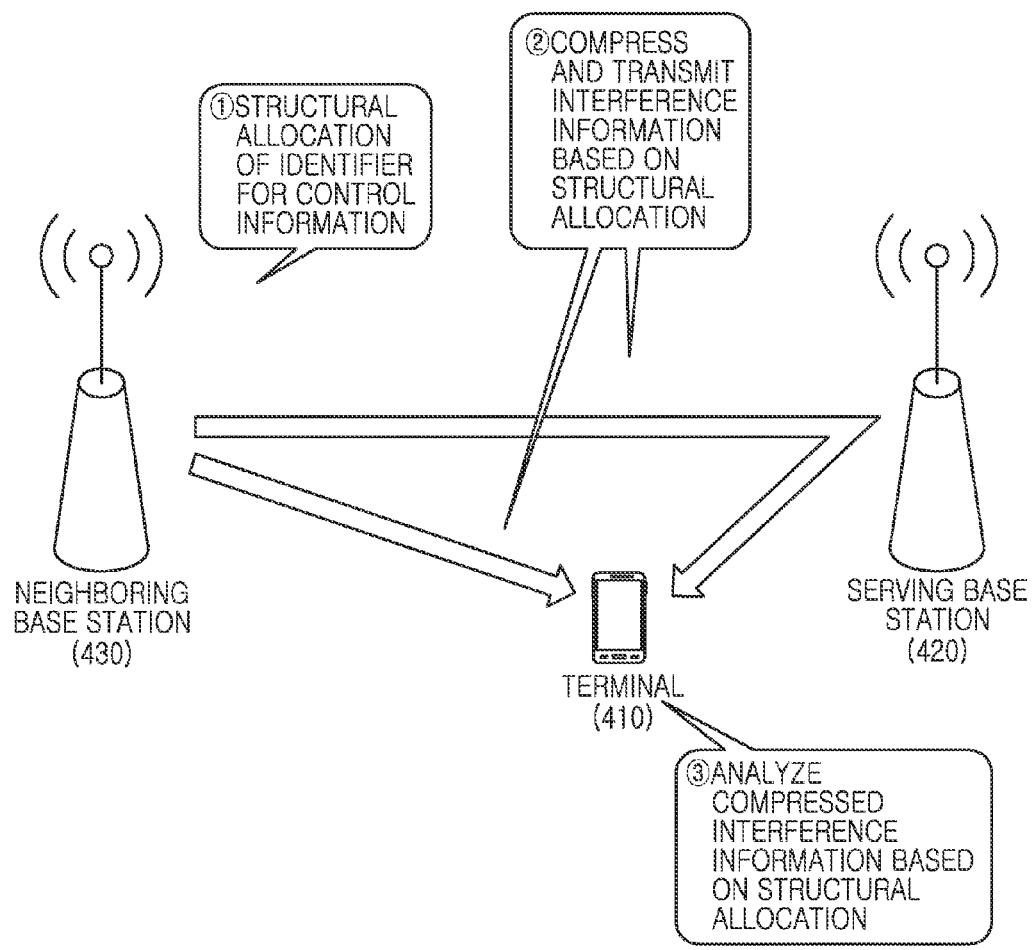
FIG. 4 illustrates how to provide compressed interference information in a wireless communication system according to an embodiment of the present disclosure.

FIG. 4 illustrates how to provide compressed interference information in a wireless communication system according to an embodiment of the present disclosure.

Referring to FIG. 4, a neighboring base station 430 allocates an identifier for masking control information to an accessed terminal. In this case, according to an embodiment of the present disclosure, the neighboring base station 430 performs structural allocation. In this example, the structural allocation means allocating the identifier according to a predefined rule.

For example, the neighboring base station 430 may allocate a new identifier so that an already allocated identifier and index may be consecutive. In this case, when an identifier of index 1 is already allocated, a newly allocated identifier is an identifier of index 2. Other rules in addition to indexes being consecutive may be applied. For example, a rule to allow the value difference between indexes of identifiers to be equal may be applied. In this case, when an identifier of index 1 is already allocated, a newly allocated identifier is an identifier of index (1+N).

The correspondence between the index and the identifier may be defined in various fashions. The simplest mapping between the index and the identifier is defining the identifier itself as the index. However, for the maximization of the hamming distance between coded data, consecutive indexes may not correspond to consecutive identifier values. In this case, the correspondence between the index and the identifier should be stored as separate management information. For example, the correspondence may be stored in a mapping table or in a generation function which has the index as a variable. In the case of the mapping table, an identifier that may be allocated by a base station is mapped to each index. In the case of the generation function, each identifier value is represented as a function for an index. The generation function may have a limitation in identifier generation in comparison to the mapping table type, but it has an advantage of requiring less memory because the generation function does not share the mapping table having a relatively great volume.

The neighboring base station 430 compresses interference information based on structural allocation and provides the information to a terminal 410. In this example, the interference information includes identifiers allocated to terminals accessed to the neighboring base station 430. The interference information may be transmitted through the broadcasting channel of the neighboring base station 430 or through a serving base station 420. The interference information is compressed based on the allocation rule of an identifier.

When the allocation rule is the consecutive allocation of an index, compressed interference information may include a start index and an end index. Alternatively, the compressed interference information may include a set of a start index and difference between the start index and a next index. Alternatively, the compressed interference information may include a start index, an end index, and an index for an identifier that is excluded among the identifiers from the start index to the end index.

The terminal 410 analyzes compressed interference based on structural allocation. In other words, the terminal 410 receives the compressed interference information and decompresses the information based on a rule applied to structural allocation. Thus, the terminal may obtain candidates for identifiers allocated to terminals accessed to the neighboring base station 430. In this case, all the candidates include actually allocated identifiers.

The particular examples of how to compress and decompress the interference information are as follows.

When identifiers of indexes 3 to 7 are allocated and one identifier is 16-bit, interference information is a total of 80 bits and identifier values include {identifier 3, identifier 4, identifier 5, identifier 6, and identifier 7}. Alternatively, when indexes, not identifier values are provided, interference information is still a total of 80 and indexes include {3, 4, 5, 6, and 7}. However, according to an embodiment of the present disclosure, when allocating identifiers having consecutive indexes, compression may be performed as below.

When based on a mapping table, instead of providing the value or index of each of identifiers, a range to which identifiers are allocated may be provided as interference information. For example, when identifiers of indexes 3 to 7 are allocated, interference information is 32 bit because only the minimum value 3 and the maximum value 7 are needed. In this case, the interference information may include Equation 1 below:

$$\{n_{min}, n_{max}\} \quad \text{Equation 1}$$

In Equation 1 above, the $n_{min}$ means the minimum value and the $n_{max}$ means the maximum value.

As another embodiment based on a mapping table, the difference between the maximum value and the minimum value instead of the maximum value may be provided. When the difference is provided, the size of interference information may decreases more than when the minimum value and the maximum value are provided. In this case, the interference information may include Equation 2 below:

$$\{n_{min}, n_{max}-n_{min}\} \quad \text{Equation 2}$$

In Equation 2 above, the $n_{min}$ means the minimum value and the $n_{max}$ means the maximum value.

In an embodiment based on a mapping table, an allocation rule aims at sequentially allocating in the order of index. However, when a specific terminal is disaccessed, a hole-in-range occurs inevitably. When providing a notice of a range only, an unnecessary identifier search may occur because it is impossible to provide a notice of the presence of a hole. Thus, in preparation for the presence of a hole, an index for an identifier where a hole occurs may be further added in addition to a range. In this case, the interference information may include Equation 3 below:

$$\{n_{min}, n_{max}, N_{hole}, IDX_{hole1}, \ldots\},$$

$$\{n_{min}, n_{max}-n_{min}, N_{hole}, IDX_{hole1}, \ldots\} \quad \text{Equation 3}$$

In Equation 3 above, the $n_{min}$ means the minimum value, the $n_{max}$ means the maximum value, the $N_{hole}$ means the number of holes, and the $IDX_{hole1}$ means the index of a first hole.

When based on a generation function, the exponent product of a primitive factor ($\alpha$) may be used as a particular example of a generation function. All 16-bit identifier values may represented by Equation 4 below according to a finite field theory, and an identifier corresponding to a specific index may be represented by Equation 5 below:

$$A_{ID} = \{0, 1, \alpha, \alpha^2, \ldots, \alpha 2^{N-2}\} \qquad \text{Equation 4}$$

In Equation 4 above, the $A_{ID}$ means a set of identifiers, the $\alpha$ means a primitive factor, and the N means the bit number of an identifier.

$$ID[i] = f(i) = \alpha^i \qquad \text{Equation 5}$$

in Equation 5 above, the ID[i] means the identifier of index i, the f(i) means a generation function, and the $\alpha$ means a primitive factor.

When based on the generation function, it is possible to perceive the range of an index through a simple equation without a need for a base station and a terminal to share the whole of the mapping table. Except for sharing a function instead of sharing the mapping table, a compression technique is the substantially same as in the case of the above-described mapping table. That is, it is possible to provide the minimum value and the maximum value represented by the input variable of the generation function or provide the minimum value and the difference between the minimum value and the maximum value and in addition, it is possible to further add an index for an identifier where a hole occurs.

Figure 5:
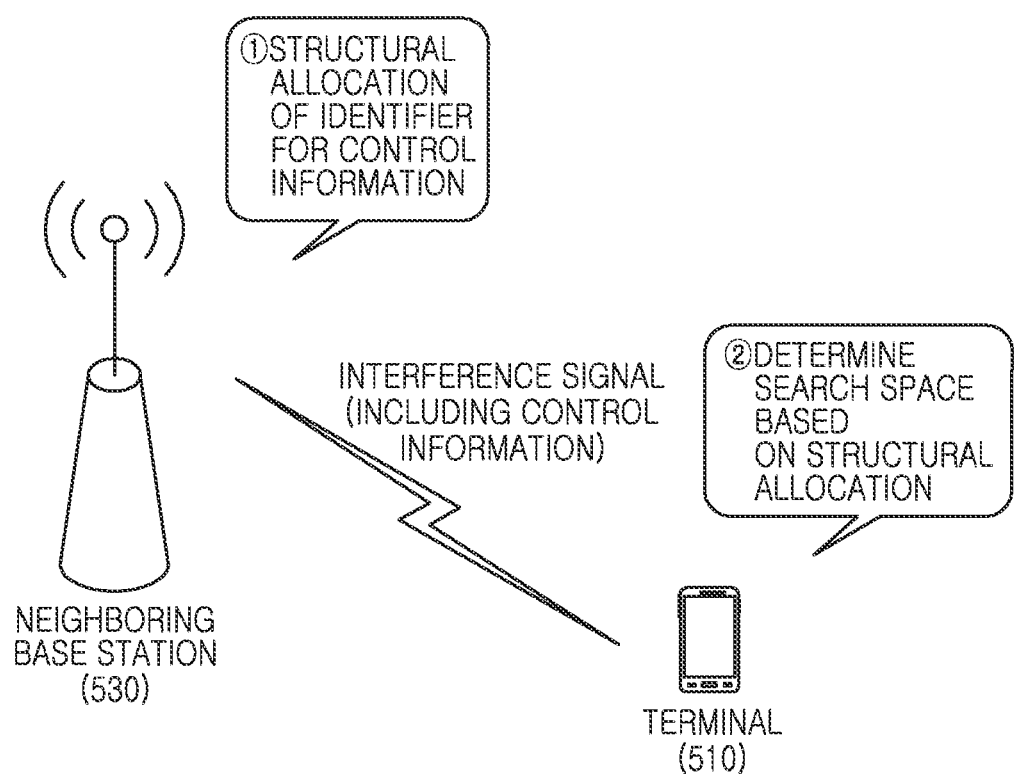
FIG. 5 illustrates how to perform blind detection in a wireless communication system according to an embodiment of the present disclosure.

FIG. 5 illustrates how to perform blind detection in a wireless communication system according to an embodiment of the present disclosure.

Referring to FIG. 5, a neighboring base station 530 allocates an identifier for masking control information to an accessed terminal. In this case, according to an embodiment of the present disclosure, the neighboring base station 530 performs structural allocation. In this example, the structural allocation means allocating the identifier according to a predefined rule. For example, the neighboring base station 530 may allocate a new identifier so that an already allocated identifier and index may be consecutive. For example, when an identifier of index 1 is already allocated, a newly allocated identifier may be an identifier of index 2.

The terminal 510 perceives an initial one identifier by blind-detecting control information transmitted by the neighboring base station 530. In addition, the terminal 510 determines a search space in which at least one additional identifier may be included, according to a rule applied to the structural allocation. Thus, the terminal 510 may determine candidates for identifiers. In this case, the candidates may include a non-allocated identifier.

A particular example of the blind detection is as follows.

In the case of typical blind detection, an error in interference information is big because an effective identifier is detected through blind detection on each of received sub frames. However, according to an embodiment of the present disclosure, an error in detected interference information decreases because it is possible to further obtain information on identifiers used in an interference cell. An initial identifier is perceived through blind detection or transferred through higher signaling. An identifier search section at a specific time n is defined based on an allocation rule by previously detected identifiers. The identifier search space may be defined by Equation 6 below:

$$S[n] = [\min ID_{Index[n]}, \max ID_{index[n]}]$$

$$\min ID_{index[n]} = \min(ID_{Index[n]}, ID_{Index[n-2]}, \ldots, ID_{Index[n-d+1]}) - \text{offset}$$

$$\max ID_{index[n]} = \max(ID_{Index[n]}, ID_{Index[n-2]}, \ldots, ID_{Index[n-d+1]}) + \text{offset} \qquad \text{<Equation 6>}$$

In Equation 6 above, the n means an index for a time, the S[n] means an identifier search section at the time n, the $\min ID_{index[n]}$ means the minimum value in a search section at the time n, the $\max ID_{index[n]}$ means the maximum value in a search section at the time n, the $ID_{index[n]}$ means an identifier detected at the time n, the d means the number of detection times reflected for determining a search space, and the offset means the margin of a search section.

That is, as in Equation 3, a terminal determines a search space by providing additional margins to the minimum value and maximum value of a recently detected RNTI index.

Figure 6:
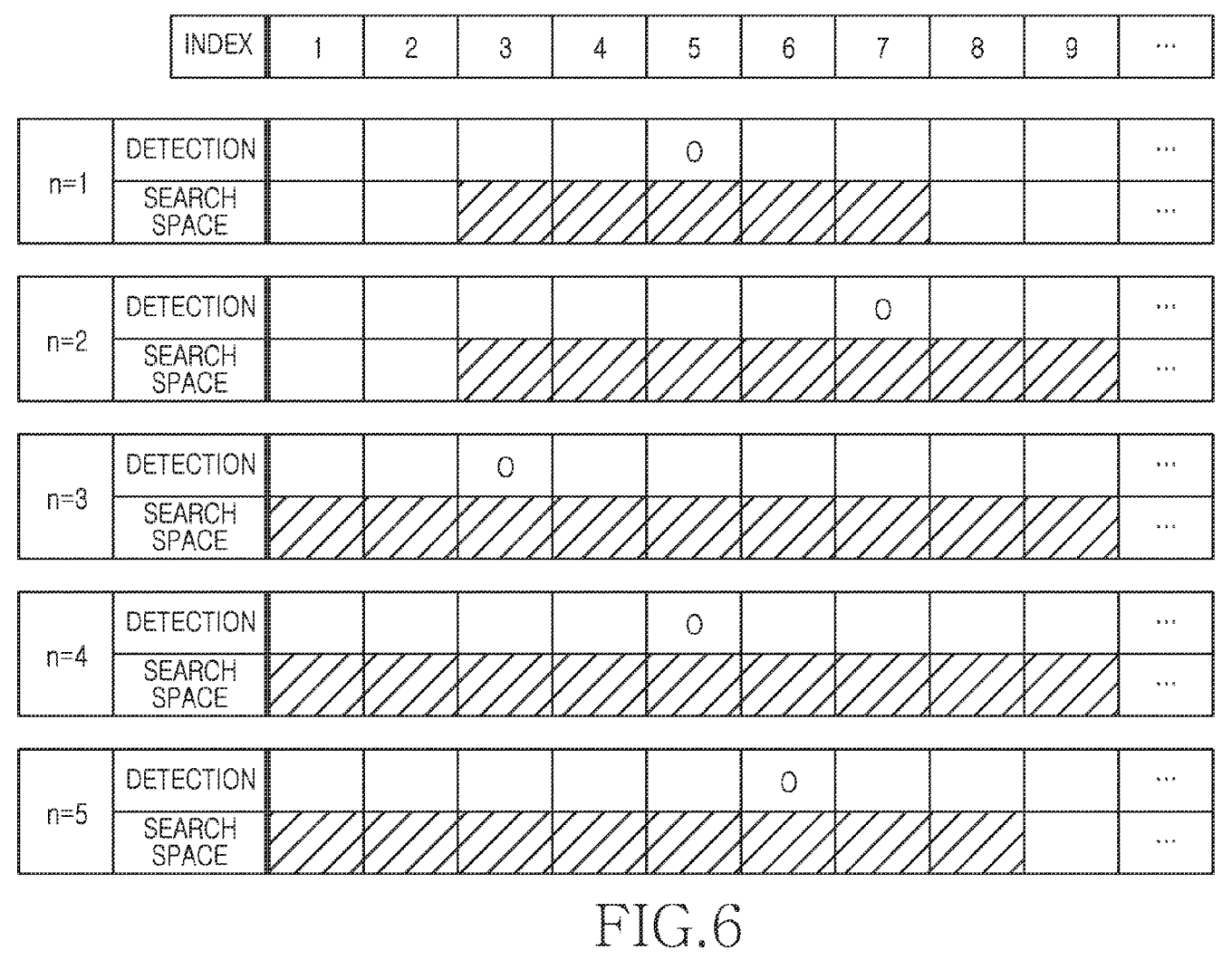

FIG. 6 illustrates a particular example of blind detection in a wireless communication system according to an embodiment of the present disclosure.

Referring to FIG. 6, the offset is set to 2 and the number of previous detection times reflected for determining a search space is set to 3. As illustrated in FIG. 6, at time 1 (n=1), an identifier of index 5 is initially detected and thus a search space is determined as [3, 7]. At time 2 (n=2), since a terminal performs blind detection in a search space of [3, 7], an identifier of index 7 is detected and thus a search space is determined as [3, 9]. At time 3 (n=3), since a terminal performs blind detection in a search space of [3, 9], an identifier of index 3 is detected and thus a search space is determined as [1, 9]. At time 4 (n=4), since a terminal performs blind detection in a search space of [1, 9], an identifier of index 5 is detected and thus a search space is determined as [1, 9]. At time 5 (n=5), since a terminal performs blind detection in a search space of [1, 9], an identifier of index 6 is detected. In this case, since only past three detection values are reflected, the maximum value of a detected index is six and a search space is determined as [1, 8].

Figure 7:
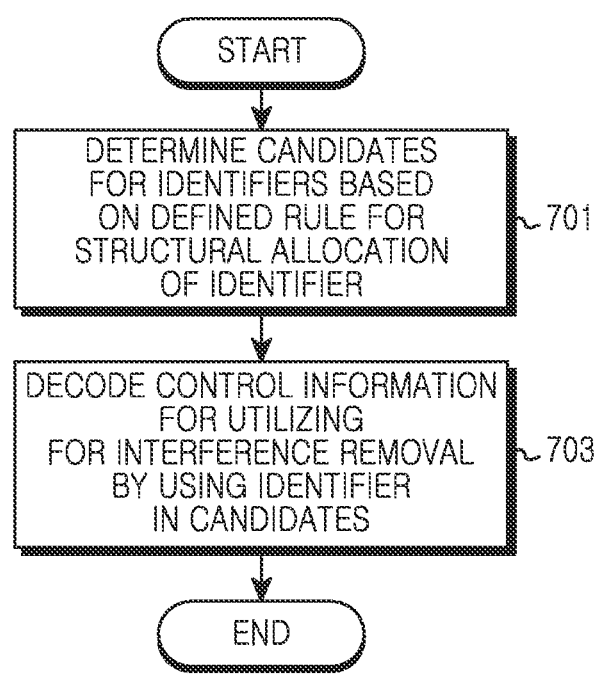
FIG. 7 illustrates the operation procedure of a terminal in a wireless communication system according to an embodiment of the present disclosure.

FIG. 7 illustrates the operation procedure of a terminal in a wireless communication system according to an embodiment of the present disclosure.

Referring to FIG. 7, the terminal determines candidates for identifiers based on a rule defined for the structural allocation of an identifier in operation 701. For example, when the wireless communication system is an LTE system, the identifier may be referred to as RNTI. A particular process of determining the candidates may depend on an embodiment. For example, information on the candidates may be provided from a serving base station or a neighboring base station or may be determined based on a history of identifier detection.

Then, the terminal may proceed to operation 703 and decodes control information to be utilized for removing interference by using identifiers in the candidates. That is, the terminal decodes a control channel that the neighboring base station transmits to terminals accessed to the neighboring base station and in this case, the terminal uses identifiers in the candidates. For example, when the wireless communication system is an LTE system, the control channel may be referred to as PDCCH. Thus, the terminal may perceive the transmission time and frequency of a downlink signal of the neighboring base station. Thus, the terminal may effectively remove the interference signal based on information on the perceived downlink signal of the neighboring base station, i.e., interference signal.

Figure 8:
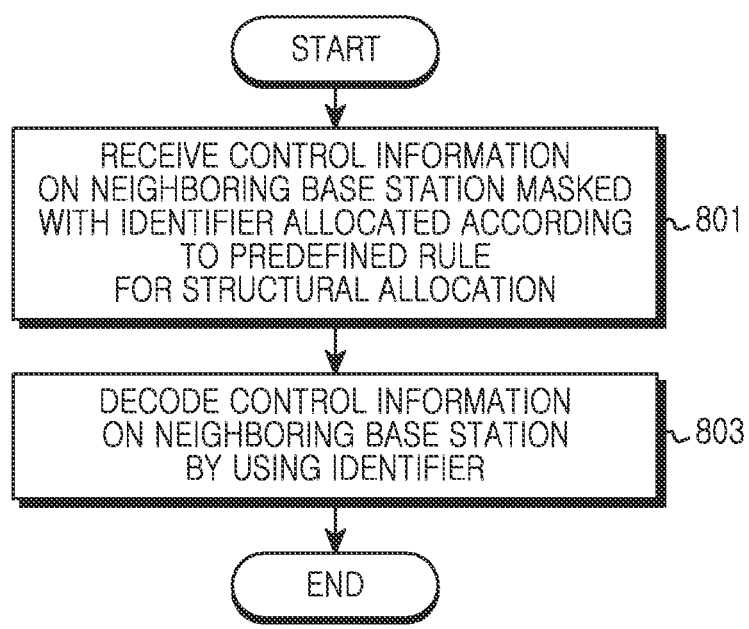
FIG. 8 illustrates the operation procedure of a terminal in a wireless communication system according to another embodiment of the present disclosure.

FIG. 8 illustrates the operation procedure of a terminal in a wireless communication system according to an embodiment of the present disclosure.

Referring to FIG. 8, the terminal receives control information which is masked with an identifier allocated based on a rule predefined for the structural allocation of an identifier and transmitted from a neighboring base station, in operation 801. That is, the terminal receives control information that the neighboring base station transmits to a terminal accessed to the neighboring base station, and the control information is masked with an identifier allocated by the predefined rule.

Then, the terminal proceeds to operation 803 and decodes the control information by using the identifier. That is, the terminal decodes a control channel that the neighboring base station transmits to the terminal accessed to the neighboring base station and in this case, the terminal may use identifiers in candidates determined according to the procedure as illustrated in FIG. 7.

Figure 9:
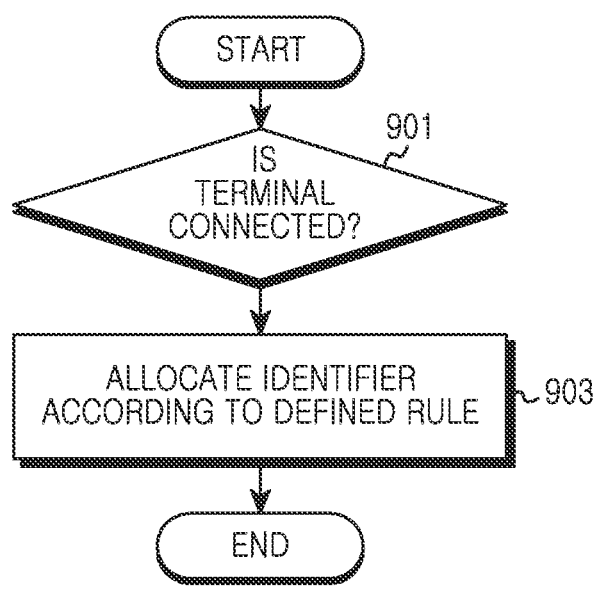
FIG. 9 illustrates the operation procedure of a base station in a wireless communication system according to an embodiment of the present disclosure.

FIG. 9 illustrates the operation procedure of a base station in a wireless communication system according to an embodiment of the present disclosure.

Referring to FIG. 9, the base station determines whether a terminal connects thereto, in operation 901. The connection includes at least one of physical synchronization achievement, authentication, security establishment, location registration, and session establishment.

When the terminal connects to the base station, the base station proceeds to operation 903 and allocates an identifier according to a predefined rule. In this example, the identifier is an identifier for masking control information. For example, when the wireless communication system is an LTE system, the identifier may be referred to as RNTI. The rule may be defined variously depending on a particular embodiment. For example, the rule may be allocating identifiers of consecutive indexes. In this case, the base station stores information that represents the correspondence between the index and the identifier. For example, the correspondence may be stored in the form of a mapping table or a generation function.

Then, although not illustrated in FIG. 9, the base station transmits control information masked with an identifier allocated according to the predefined rule. That is, the base station masks the control information with the identifier when transmitting control information to the terminal.

Figure 10:
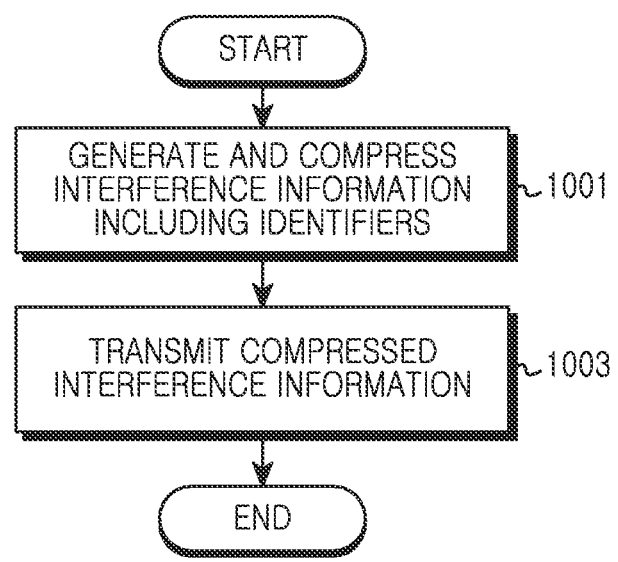
FIG. 10 illustrates the operation procedure of a base station in a wireless communication system according to another embodiment of the present disclosure.

FIG. 10 illustrates the operation procedure of a base station in a wireless communication system according to another embodiment of the present disclosure.

Referring to FIG. 10, the base station generates and compresses interference information including identifiers in operation 1001. In this example, the identifiers are for control information and are allocated to terminals accessed to the base station. For example, when the wireless communication system is an LTE system, the identifier may be referred to as RNTI. The interference information is compressed based on the allocation rule of the identifier. For example, when the allocation rule is the consecutive allocation of an index, compressed interference information may include a start index and an end index. Alternatively, the compressed interference information may include a set of a start index and difference between the start index and a next index. Alternatively, the compressed interference information may further include an index for an identifier that is excluded among the identifiers from the start index to one of the end index and the next index.

Then, the base station proceeds to operation 1003 and transmits the compressed interference information. According to an embodiment of the present disclosure, the base station may transmit the compressed interference information through a broadcasting channel. In this case, a terminal in a neighboring cell may receive interference information on the base station through the broadcasting channel. According to another embodiment of the present disclosure, the base station may transmit the compressed interference information to a neighboring base station. In this case, the neighboring base station provides compressed interference information on the base station to terminals accessed thereto. Thus, the terminal may obtain interference information on the terminal (i.e., a neighboring base station of the terminal).

Figure 11:
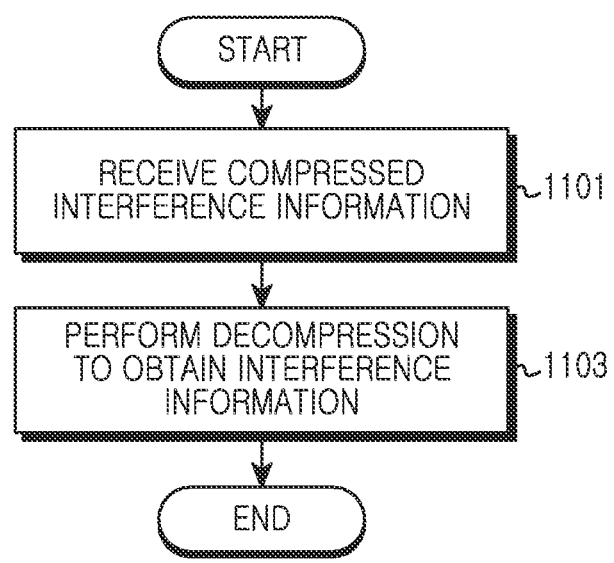
FIG. 11 illustrates the operation procedure of a terminal in a wireless communication system according to still another embodiment of the present disclosure.

FIG. 11 illustrates the operation procedure of a terminal in a wireless communication system according to another embodiment of the present disclosure.

Referring to FIG. 11, the terminal receives compressed interference information, in operation 1101. In this example, the compressed interference information is information generated by a neighboring base station and includes identifiers allocated to terminals accessed to the neighboring base station. In this example, the identifiers are for control information. For example, when the wireless communication system is an LTE system, the identifier may be referred to as RNTI. According to an embodiment of the present disclosure, the terminal may receive the compressed interference information through the broadcasting channel of the neighboring base station. According to another embodiment of the present disclosure, the terminal may receive the compressed interference information from a serving base station.

Then, the terminal proceeds to operation 1103 and decompresses the compressed interference information to obtain interference information. In other words, the terminal perceives identifiers allocated to terminals accessed to the neighboring base station, from the compressed interference information. The decompression is performed depending on the allocation rule of the identifier and on a compression method. For example, when the allocation rule is the consecutive allocation of an index, compressed interference information may include a start index and an end index. In this case, the terminal determines that the identifiers of the start index and the end index are allocated by the neighboring base station. Alternatively, the compressed interference information may include a set of a start index and difference between the start index and a next index. In this case, the terminal determines the start index and the end index by using the difference and determines that the identifiers of the start index and the end index are allocated by the neighboring base station. Alternatively, the compressed interference information may further include an index for an identifier that is excluded among the identifiers from the start index to one of the end index and the next index. In this case, the terminal may exclude an excluded identifier from interference information.

Then, although not illustrated in FIG. 11, the terminal may decode control information transmitted from the neighboring base station by using the identifier, perceive the transmission time and frequency of the downlink signal of the neighboring base station and remove the interference signal based on information on the perceived downlink signal of the neighboring base station, i.e., interference signal.

Figure 12:
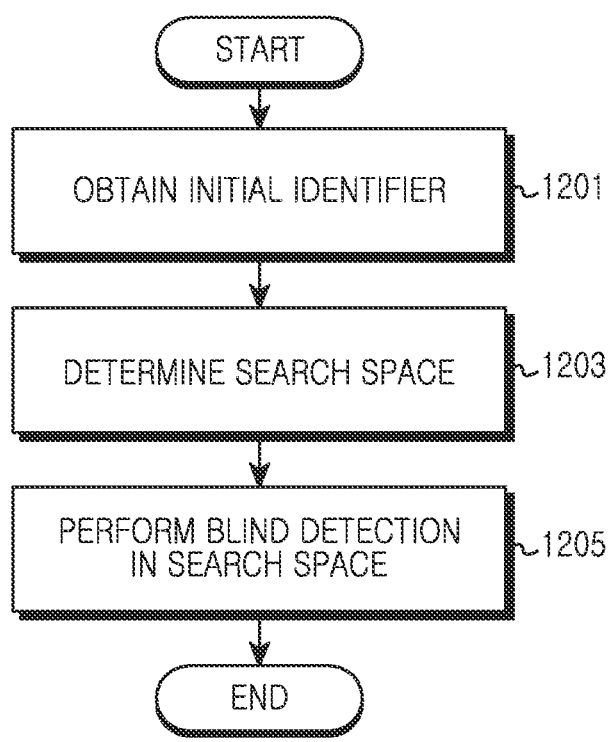
FIG. 12 illustrates the operation procedure of a terminal in a wireless communication system according to still another embodiment of the present disclosure.

FIG. 12 illustrates the operation procedure of a terminal in a wireless communication system according to still another embodiment of the present disclosure.

Referring to FIG. 12, the terminal obtains an initial identifier, in operation 1201. In this example, the initial identifier means one of identifiers allocated to terminals accessed to the neighboring base station. In other words, the initial identifier means one identifier that the terminal initially perceives while there is no information on an identifier allocated by a neighboring base station. According to an embodiment of the present disclosure, the terminal may determine the initial identifier through blind detection. Alternatively, the terminal may receive the initial identifier from the neighboring base station or a serving base station.

After obtaining the initial identifier, the terminal proceeds to operation 1203 and determines a search space. The search space means candidates for identifiers allocated by the neighboring base station. In other words, the search space means a range on which the terminal performs blind detection later. The search space is determined based on at least one of a past history of blind detection and the margin of a search section. In this example, the past history of blind detection may reflect only a limited number of results.

Then, the terminal proceeds to operation 1205 and performs blind detection in the search space. In other words, the terminal uses each of identifiers in the search space to try decoding a control channel received from a neighboring base station and determine whether decoding is successful. For example, whether the decoding is successful may be determined based on an XOR operation result on a tail bit.

Figure 13:
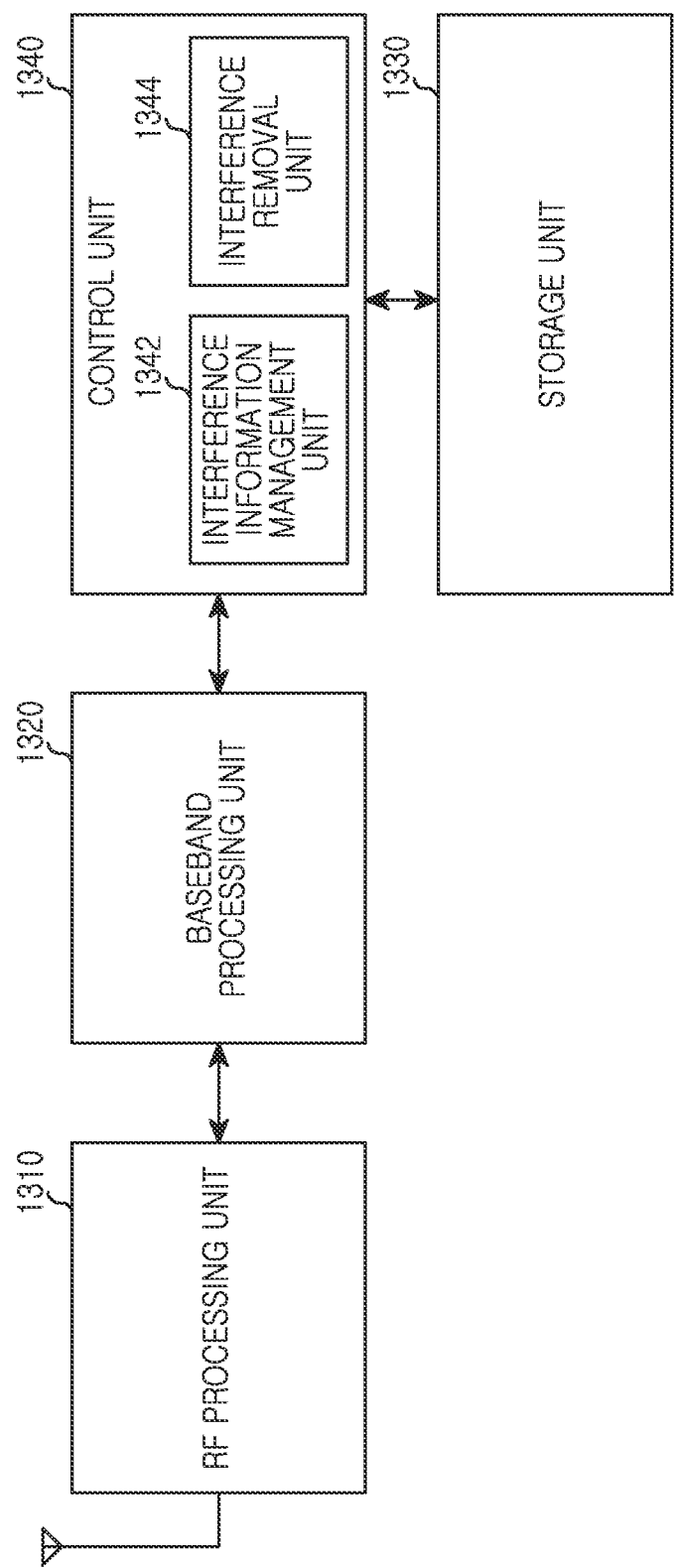
FIG. 13 is a block diagram of a terminal in a wireless communication system according to an embodiment of the present disclosure.

FIG. 13 is a block diagram of a terminal in a wireless communication system according to an embodiment of the present disclosure.

Referring to FIG. 13, the terminal includes an RF processing unit 1310, a base-band processing unit 1320, a storage unit 1330, and a control unit 1340, but is not limited thereto.

The RF processing unit 1310 performs a function of transmitting and receiving a signal through a wireless channel, such as band conversion and amplification of a signal. That is, the RF processing unit 1310 up-coverts a baseband signal provided from the base-band processing unit 1320 into an RF band signal and transmits the RF band signal through an antenna, and down-converts the RF band signal received through the antenna into a baseband signal. For example, the RF processing unit 1310 may include a transmission filter, a reception filter, an amplifier, a mixer, an oscillator, a DAC and an ADC. In FIG. 12, although only one antenna is illustrated, the terminal may include a plurality of antennas. Also, the RF processing unit 1310 may include a plurality of RF chains.

The baseband processing unit 1320 performs the conversion function between a baseband signal and a bit string according to the physical layer protocol of a system. For example, when transmitting data, the baseband processing unit 1320 codes and modulates a transmission bit string to generate complex symbols. Also, when receiving data, the baseband processing unit 1320 demodulates and decodes a baseband signal provided from the RF processing unit to restore a received bit string. In the case of for example, OFDM modulation, when transmitting data, the baseband processing unit 1320 codes and modulates a transmission bit string to generate complex symbols, maps the complex symbols to sub-carriers and configures OFDM symbols through IFFT operation and CP insertion. Also, when receiving data, the baseband processing unit 1320 divides a baseband signal provided from the RF processing unit 1310 into OFDM symbols, restores signals mapped to sub-carriers through IFFT operation and restores a received bit string through demodulation and decoding. The baseband processing unit 1320 and the RF processing unit 1310 transmits and receives a signal as described above. Thus, the baseband processing unit 1320 and the RF processing unit 1310 may be referred to as a transmission unit, a reception unit or a transceiving unit.

The storage unit 1330 stores a fundamental program for the operation of the terminal, an application program, or data such as configuration information. According to an embodiment of the present disclosure, the storage unit 1330 may store information that represents the correspondence between an identifier index and an identifier value. For example, the correspondence may be defined in the form of a mapping table or a generation function. The storage unit 1330 provides stored data in response to a request from the control unit 1340.

The control unit 1340 controls the overall operations of the terminal. For example, the control unit 1340 transmits and receives a signal through the baseband processing unit 1320 and the RF processing unit 1310. According to an embodiment of the present disclosure, the control unit 1340 includes an interference information management unit 1342 for managing interference information on a neighboring base station and an interference removal unit 1344 that removes interference based on the interference information. For example, the control unit 1340 allows the terminal to perform the procedures illustrated in FIGS. 7, 10 and 11 as described above. The operation of the control unit 1340 according to an embodiment of the present disclosure is as follows.

The control unit 1340 determines identifier candidates based on a rule defined for the structural allocation of an identifier. According to an embodiment of the present disclosure, the control unit 1340 receives compressed interference information through the broadcasting channel of the neighboring base station or from a serving base station and decompresses the compressed interference information according to the allocation rule and compression technique of the identifier to obtain interference information. According to another embodiment of the present disclosure, the control unit 1340 determines a search space that is a range where blind detection is performed, based on an initial identifier, and performs blind detection within the search space. In this example, the search space is determined based on at least one of a past history of blind detection and the margin of a search section. Thus, the search space may be updated whenever blind detection is performed. The control unit 1340 uses identifiers within the candidates to decode control information to be utilized for removing interference.

Figure 14:
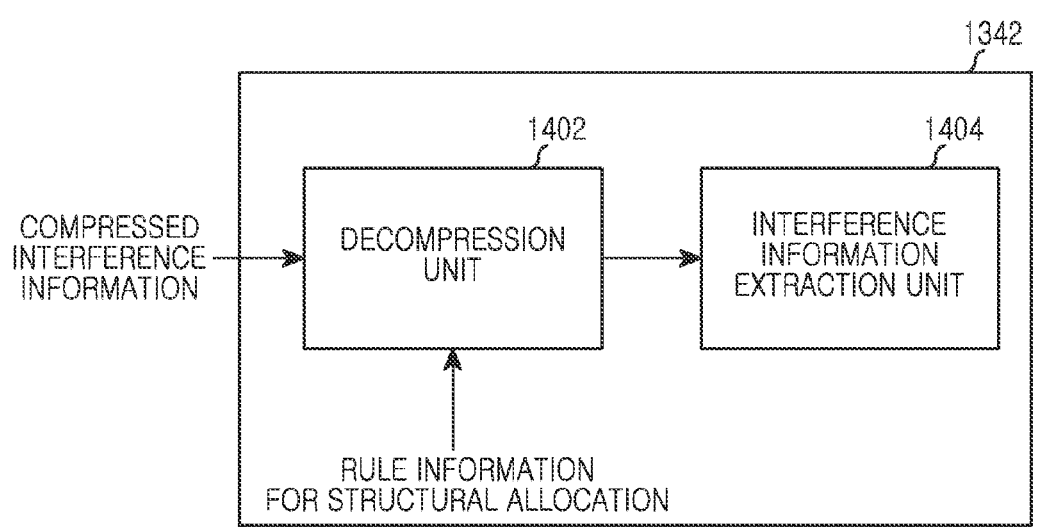
FIG. 14 is a block diagram of an interference information management unit in a wireless communication system according to an embodiment of the present disclosure.

FIG. 14 is a block diagram of the interference information management unit 1342 in a wireless communication system according to an embodiment of the present disclosure. FIG. 14 illustrates an example of the interference information management unit 1342 for an embodiment of how interference information is provided from a neighboring base station.

Referring to FIG. 14, the interference information management unit 1342 includes a decompression unit 1402 and an interference information extraction unit 1404. The decompression unit 1402 receives compressed interference information received through a control channel or a broadcasting channel and decompresses the compressed interference information based on an allocation rule defined for the structural allocation of an identifier. The interference information extraction unit 1404 lastly extracts interference information to be utilized for removing interference.

Figure 15:
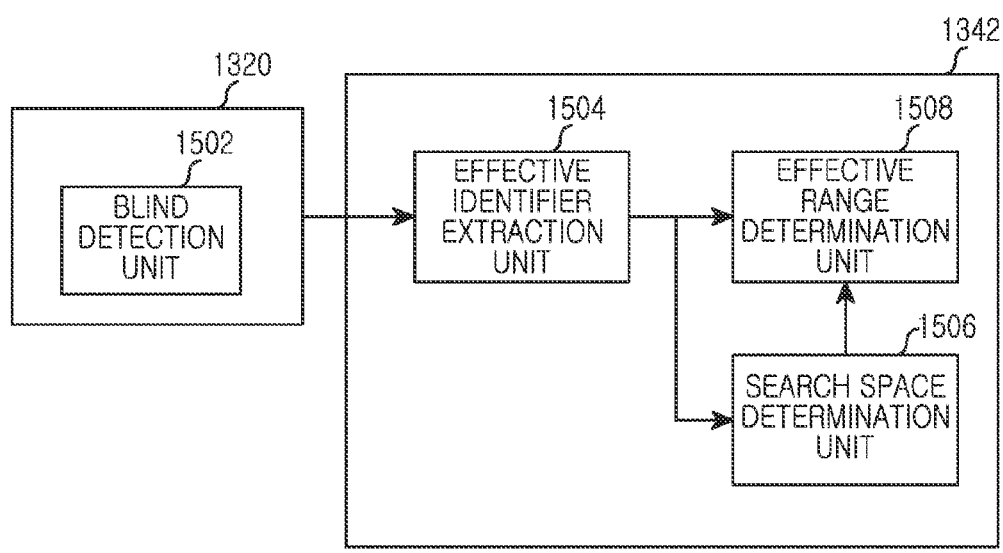
FIG. 15 is a block diagram of a base-band processing unit and an interference information management unit in a wireless communication system according to another embodiment of the present disclosure.

FIG. 15 is a block diagram of the baseband processing unit 1320 and the interference information management unit 1342 in a wireless communication system according to another embodiment of the present disclosure. FIG. 15 illustrates an example of the interference information management unit 1342 for an embodiment of how interference information is obtained through blind detection.

Referring to FIG. 15, the baseband processing unit 1320 includes a blind detection unit 1502, and interference information management unit 1342 includes an effective identifier extraction unit 1504, a search space determination unit 1506, and an effective range determination unit 1508.

The blind detection unit 1502 performs blind detection on a control channel transmitted from a neighboring base station and provides the value of a detected identifier to the effective identifier extraction unit 1504. The effective identifier extraction unit 1504 checks whether resource allocation according to an identifier provided from the blind detection unit 1502 is normally performed, to determine the effectiveness of the identifier. The search space determination unit 1506 sets a search space based on an estimated identifier. The effective range determination unit 1508 determines whether an identifier perceived to be effective by the effective identifier extraction unit 1504 is included in a search space determined by the search space determination unit 1506, to determine effectiveness. Thus, it is possible to perform interference removal by using only an identifier determined to be effective.

Figure 16:
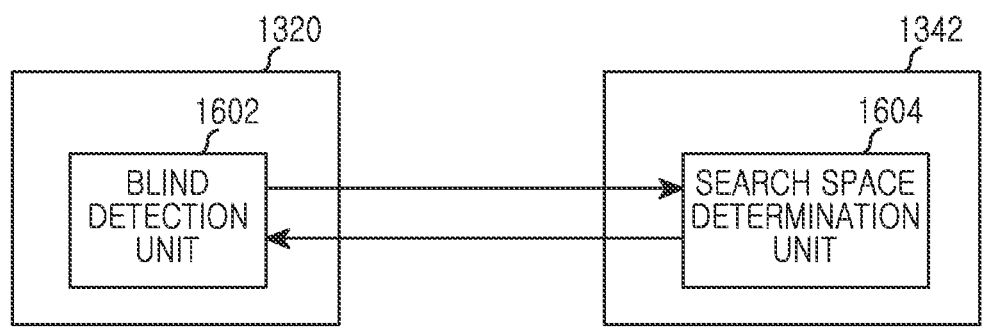
FIG. 16 is a block diagram of a base-band processing unit and an interference information management unit in a wireless communication system according to still another embodiment of the present disclosure.

FIG. 16 is a block diagram of the baseband processing unit 1320 and the interference information management unit 1342 in a wireless communication system according to another embodiment of the present disclosure. FIG. 16 illustrates an example of the interference information management unit 1342 for an embodiment of how interference information is obtained through blind detection.

Referring to FIG. 16, the baseband processing unit 1320 includes a blind detection unit 1602, and interference information management unit 1342 includes a search space determination unit 1604. The blind detection unit 1602 performs blind detection on a control channel transmitted from a neighboring base station and provides the value of a detected identifier to the search space determination unit 1604. The search space determination unit 1604 sets a search space based on an estimated identifier. In particular, the search space determination unit 1604 determines the approximate range of the search space of an identifier by using an initial identifier and updates the search space by using an identifier detected through measurement later. In order to set the initial search space, information on the initial identifier may be provided to the search space determination unit 1604. The initial identifier may be provided from the blind detection unit 1602 or obtained from a base station.

Figure 17:
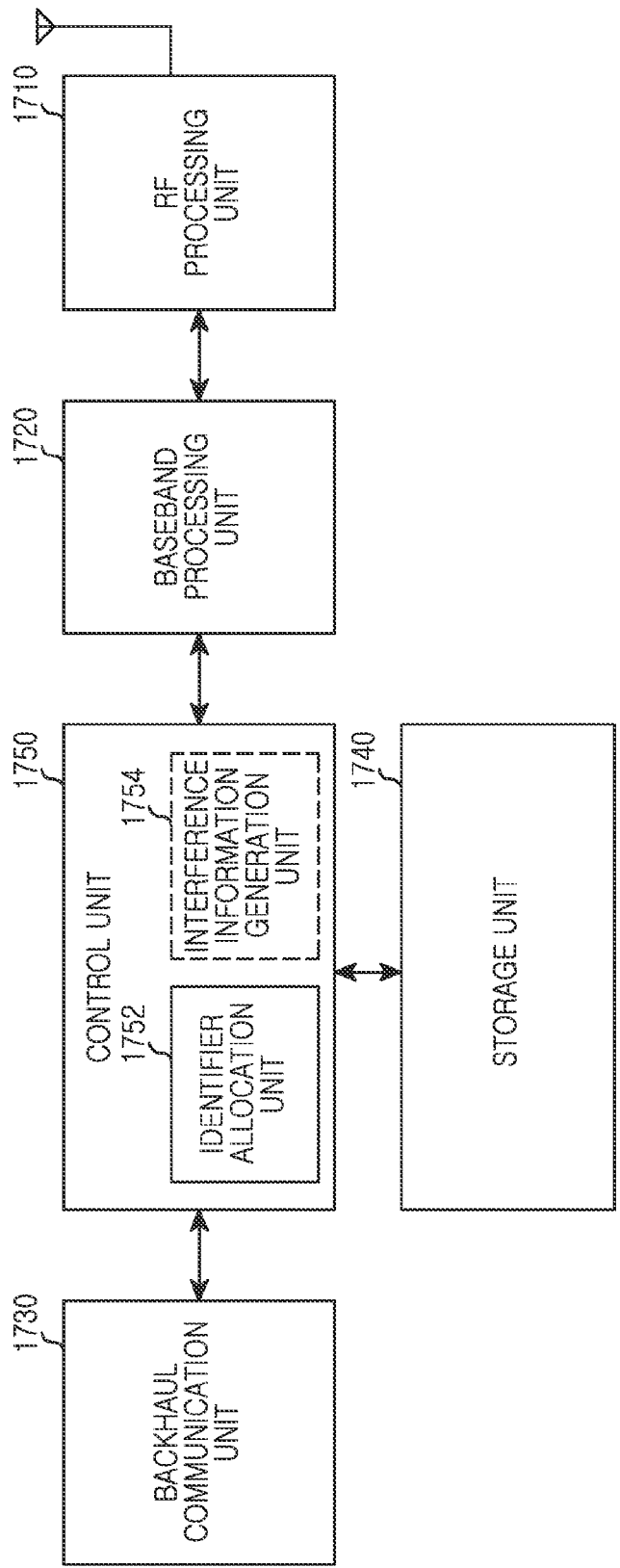
FIG. 17 is a block diagram of a base station in a wireless communication system according to an embodiment of the present disclosure.

FIG. 17 is a block diagram of a base station in a wireless communication system according to an embodiment of the present disclosure.

Referring to FIG. 17, the base station includes an RF processing unit 1710, a base-band processing unit 1720, a backhaul communication unit 1730, a storage unit 1740, and a control unit 1750, but is not limited thereto.

The RF processing unit 1710 performs a function of transmitting and receiving a signal through a wireless channel, such as band conversion and amplification of a signal. That is, the RF processing unit 1710 up-coverts a baseband signal provided from the base-band processing unit 1720 into an RF band signal, transmits the RF band signal through an antenna, and down-converts the RF band signal received through the antenna into a baseband signal. The RF processing unit 2210 may include RF chains for each of a plurality of antennas, and each RF chain may include a transmission filter, a reception filter, an amplifier, a mixer, an oscillator, a DAC and an ADC.

The baseband processing unit 1720 performs the conversion function between a baseband signal and a bit string according to the physical layer protocol of a system. In the case of e.g., OFDM modulation, when transmitting data, the baseband processing unit 1720 codes and modulates a transmission bit string to generate complex symbols, maps the complex symbols to sub-carriers and configures OFDM symbols through IFFT operation and CP insertion. Also, when receiving data, the baseband processing unit 1720 divides a baseband signal provided from the RF processing unit 1710 into OFDM symbols, restores signals mapped to sub-carriers through IFFT operation and restores a received bit string through demodulation and decoding. The baseband processing unit 1720 and the RF processing unit 1710 transmit and receive a signal as described above. Thus, the baseband processing unit 1720 and the RF processing unit 1710 may be referred to as a transmission unit, a reception unit or a transceiving unit.

The backhaul communication unit 1730 provides an interface for performing communication with other nodes in another base station or a network. That is, the backhaul communication unit 1730 converts a bit string transmitted from the base station to another node, such as another base station or a core network, into a physical signal and converts a physical signal received from the other node into a bit string. The storage unit 1740 stores a fundamental program for the operation of the base station, an application program, or data such as configuration information. According to an embodiment of the present disclosure, the storage unit 1740 may store information that represents the correspondence between an identifier index and an identifier value. For example, the correspondence may be defined in the form of a mapping table or a generation function. The storage unit 1740 provides stored data in response to a request from the control unit 1750.

The control unit 1750 controls the overall operations of the base station. For example, the control unit 1750 transmits and receives a signal through the baseband processing unit 1720 and the RF processing unit 1710 or the backhaul communication unit 1730. Also, the control unit 1750 writes and reads to and from the storage unit 1740. According to an embodiment of the present disclosure, the control unit 1750 includes an identifier allocation unit 1752 that allocates an identifier according to an allocation rule defined for structural allocation. Also, according to an embodiment of the present disclosure, the control unit 1750 may further include an interference information generation unit 1754 that generates and compresses interference information to be provided to a terminal connecting to a neighboring cell. However, in an embodiment where interference information is obtained through blind decoding, the interference information generation unit 1754 may not be included. For example, the control unit 1750 allows the base station to perform the procedures illustrated in FIGS. 8, 9 and 11 as described above. The operation of the control unit 1750 according to an embodiment of the present disclosure is as follows.

When a terminal connects to the base station, the control unit 1750 allocates an identifier according to a rule defined for structural allocation. In this example, the identifier is an identifier for masking control information. The rule may be defined variously depending on a particular embodiment. For example, the rule may be allocating identifiers having consecutive indexes.

When interference information is provided from a base station in accordance with an embodiment of the present disclosure, the control unit 1750 generates interference information including identifiers and compresses the interference information. For example, when the allocation rule is the consecutive allocation of an index, compressed interference information may include a start index and an end index. Alternatively, the compressed interference information may include a set of a start index and difference between the start index and a next index. Alternatively, the compressed interference information may further include an index for an identifier that is excluded among the identifiers from the start index to one of the end index and the next index. The control unit 1750 transmits the compressed interference information. According to an embodiment of the present disclosure, the control unit 1750 may transmit the compressed interference information through a broadcasting channel by using the baseband processing unit 1750 and the RF processing unit 1710. According to another embodiment of the present disclosure, the control unit 1750 may transmit the compressed interference information to a neighboring base station through the backhaul communication unit 1730.

Figure 18:
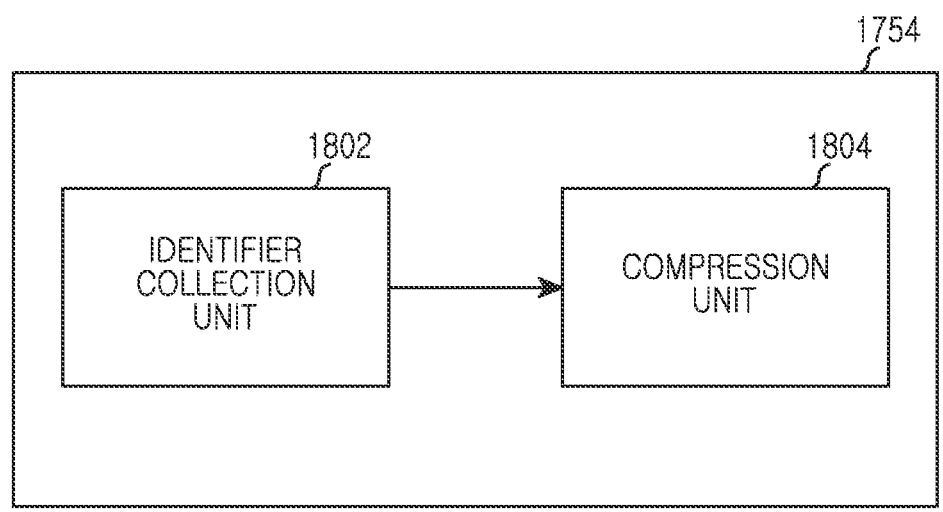
FIG. 18 is a block diagram of an interference information management unit in a wireless communication system according to an embodiment of the present disclosure.

FIG. 18 is a block diagram of the interference information generation unit 1754 in a wireless communication system according to an embodiment of the present disclosure.

Referring to FIG. 18, the interference information generation unit 1754 includes an identifier collection unit 1802 and a compression unit 1804.

The identifier collection unit 1802 collects information on identifiers allocated according to the current identifier allocation state. The compression unit 1804 compresses interference information according to an allocation rule defined for structural allocation. For example, when the allocation rule is the consecutive allocation of an index, compressed interference information may include a start index and an end index. Alternatively, the compressed interference information may include a set of a start index and difference between the start index and a next index. Alternatively, the compressed interference information may further include an index for an identifier that is excluded among the identifiers from the start index to one of the end index and the next index.

By structurally allocating an identifier for masking control information in a wireless communication system, overhead decreases through an increase in compression rate of interference information and an error in interference information decreases.

Embodiments of the present invention according to the claims and description in the specification can be realized in the form of hardware, software or a combination of hardware and software.

Such software may be stored in a computer readable storage medium. The computer readable storage medium stores one or more programs (software modules), the one or more programs comprising instructions, which when executed by one or more processors in an electronic device, cause the electronic device to perform methods of the present invention.

Such software may be stored in the form of volatile or non-volatile storage such as, for example, a storage device like a Read Only Memory (ROM), whether erasable or rewritable or not, or in the form of memory such as, for example, Random Access Memory (RAM), memory chips, device or integrated circuits or on an optically or magnetically readable medium such as, for example, a Compact Disc (CD), Digital Video Disc (DVD), magnetic disk or magnetic tape or the like. It will be appreciated that the storage devices and storage media are embodiments of machine-readable storage that are suitable for storing a program or programs comprising instructions that, when executed, implement embodiments of the present invention. Embodiments provide a program comprising code for implementing apparatus or a method as claimed in any one of the claims of this specification and a machine-readable storage storing such a program. Still further, such programs may be conveyed electronically via any medium such as a communication signal carried over a wired or wireless connection and embodiments suitably encompass the same.

While the present disclosure has been illustrated and described with reference to various embodiments thereof, it will be understood by those skilled in the art that various changes in form and details may be made therein without departing from the spirit and range of the present disclosure as defined by the appended claims and their equivalents.

What is claimed is:

1. A method for operating a terminal in a wireless communication system, the method comprising:
receiving, from a neighboring base station, control information masked with an identifier allocated according to a predefined rule for structural allocation;
determining at least one candidate identifier based on the predefined rule for structural allocation; and
processing the control information by using the at least one candidate identifier.

2. The method of claim 1, wherein the predefined rule for structural allocation comprises allocating indexes consecutively.

3. The method of claim 1, wherein the determining of the at least one candidate identifier comprises:
receiving compressed interference information comprising information regarding at least one index corresponding to the at least one candidate identifier; and
analyzing the compressed interference information by using the predefined rule for structural allocation.

4. The method of claim 3, wherein the compressed interference information comprises at least one of a start index, an end index, a difference between the start index and the end index, a number of index holes, or indexes corresponding to the index holes, of identifiers allocated by the neighboring base station.

5. The method of claim 3, wherein the compressed interference information is received through one of a control channel of a serving base station and a broadcasting channel of the neighboring base station.

6. The method of claim 1, wherein the determining of the at least one candidate identifier comprises:
determining a search space for blind detection based on the predefined rule for structural allocation; and
performing the blind detection on the at least one candidate identifier belonging to the search space.

7. The method of claim 6, wherein the search space is determined based on at least one of a past history of the blind detection and a margin of a search section.

8. A method for operating a base station in a wireless communication system, the method comprising:
allocating, to a terminal, an identifier according to a predefined rule for structural allocation;
transmitting the control information masked with the identifier; and
transmitting compressed interference information comprising information regarding at least one index corresponding to at least one candidate identifier for processing the control information.

9. The method of claim 8, wherein the predefined rule for structural allocation comprises allocating indexes consecutively.

10. The method of claim 8, wherein the compressed interference information comprises at least one of a start index, an end index, a difference between the start index and the end index, a number of index holes, or indexes corresponding to the index holes, of identifiers allocated by a neighboring base station.

11. The method of claim 8, wherein the compressed interference information is transmitted to another terminal through one of a control channel of a serving base station and a broadcasting channel of the base station.

12. The method of claim 8, wherein the compressed interference information comprises an index for an identifier that is excluded from identifiers from a start index to one of an end index and a next index.

13. An apparatus for a terminal in a wireless communication system, the apparatus comprising:
 a reception unit configured to receive, from a neighboring base station, control information masked with an identifier allocated according to a predefined rule for structural allocation; and
 a control unit configured to:
 determine at least one candidate for identifier based on the predefined rule for structural allocation,
 process the control information by using the at least one candidate identifier.

14. The apparatus of claim 13, wherein the predefined rule for structural allocation comprises allocating indexes consecutively.

15. The apparatus of claim 13,
 wherein the reception unit is further configured to receive compressed interference information comprising information regarding at least one index corresponding to the at least one candidate identifier, and
 wherein the control unit is further configured to analyze the compressed interference information by using the predefined rule for structural allocation.

16. The apparatus of claim 15, wherein the compressed interference information comprises at least one of a start index, an end index, a difference between the start index and the end index, a number of index holes, or indexes corresponding to the index holes, of identifiers allocated by the neighboring base station.

17. The apparatus of claim 15, wherein the compressed interference information is received through one of a control channel of a serving base station and a broadcasting channel of the neighboring base station.

18. The apparatus of claim 13, wherein the control unit is further configured to:
 determine a search space for blind detection based on the predefined rule for structural allocation, and perform the blind detection on the at least one candidate identifier belonging to the search space.

19. The apparatus of claim 18, wherein the search space is determined based on at least one of a past history of the blind detection and a margin of a search section.

20. An apparatus for a base station in a wireless communication system, the apparatus comprising:
 a control unit configured to allocate, to a terminal, an identifier according to a predefined rule for structural allocation; and
 a communication unit configured to:
 transmit control information masked with the identifier, and
 transmit compressed interference information comprising information regarding at least one index corresponding at least one candidate identifier for processing the control information.

21. The apparatus of claim 20, wherein the predefined rule for structural allocation comprises allocating indexes consecutively.

22. The apparatus of claim 21, wherein the allocated consecutive indexes do not correspond to consecutive identifier values.

23. The apparatus of claim 20, wherein the compressed interference information comprises at least one of a start index, an end index, a difference between the start index and the end index, a number of index holes, or indexes corresponding to the index holes, of identifiers allocated by a neighboring base station.

24. The apparatus of claim 20, wherein the compressed interference information is transmitted to another terminal through one of a control channel of a serving base station and a broadcasting channel of the base station.

* * * * *